G. A. Warner,
Flour Packer,

№ 58,325.        Patented Sept. 25, 1866.

Witnesses:

Inventor:
G. A. Warner
Munn & Co
Atty's

UNITED STATES PATENT OFFICE.

GUSTAVUS A. WARNER, OF PORTLAND, OREGON.

IMPROVEMENT IN FLOUR-PACKERS.

Specification forming part of Letters Patent No. 58,325, dated September 25, 1866.

*To all whom it may concern:*

Be it known that I, GUSTAVUS A. WARNER, of Portland, in the county of Multnomah and State of Oregon, have invented a new and Improved Machine for Packing and Weighing Flour and other materials; and I do hereby declare that the following is a full, clear, and exact description thereof, which will enable others skilled in the art to make and use the same, reference being had to the accompanying drawings, forming part of this specification, in which—

Figure 1:
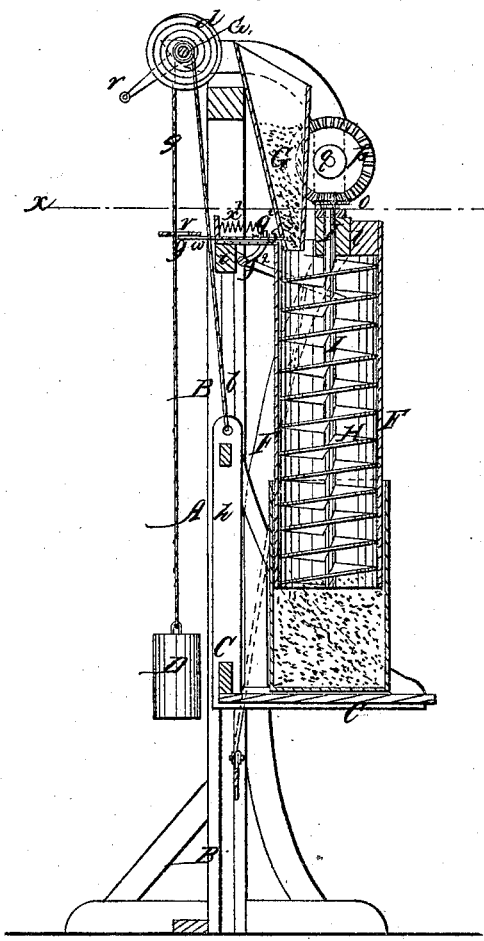
Figure 2:
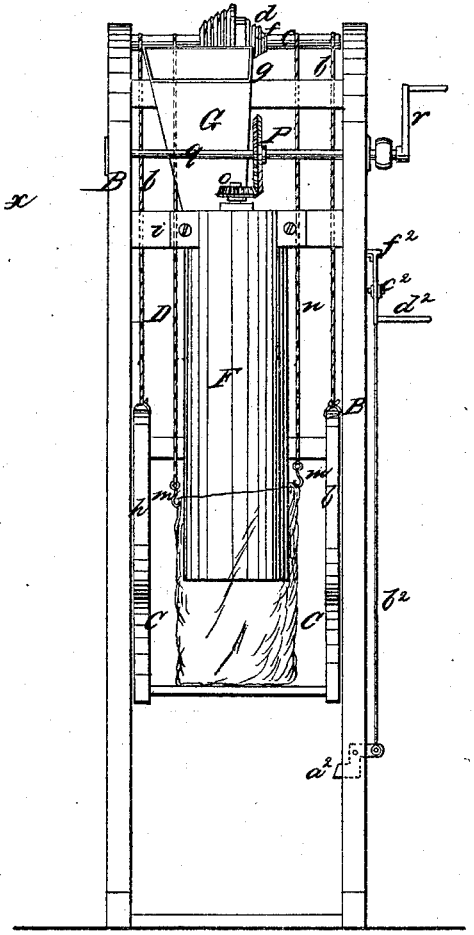
Figure 3:
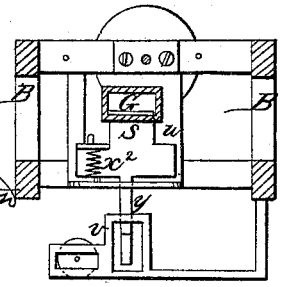

Figure 1 is a central vertical section of my improved packing and weighing machine; Fig. 2, a front elevation of the same; and Fig. 3, a horizontal section taken in the plane of the line $x\ x$, Fig. 1.

Similar letters of reference indicate like parts.

This machine for packing and weighing flour and other substances consists in a novel arrangement of a carriage, upon which the bag or other device to be filled and packed with flour is placed, in connection with a novel arrangement of parts for feeding and packing the flour therein, the said carriage being so hung and arranged with regard to the packing devices for the flour as to cut off the flour-feed the instant the weight of the flour in the bag has reached the desired or requisite amount.

Having thus stated the general principles of the present invention, I will now proceed to describe the same in detail, reference being had to the accompanying plate of drawings, hereinbefore referred to.

A in the drawings represents an upright frame, consisting of two parallel uprights, B B. In and between these uprights, moving in grooves or ways $a\ a$ of each of the same, is hung a carriage, C, which carriage is supported at each side by a cord, $b$, passing up and around the transverse shaft $c$, hung and turning in bearings of the uprights. On the central portion of this shaft $c$ is a conical-shaped pulley, $d$, having cut around it, from its smaller to its larger end, a continuous and involute groove, $f$, in which winds a cord, $g$, having upon its lower end a weight, D. This weight D is intended to be made sufficiently heavy to raise the platform or carriage C and hold it, until depressed by extraneous weight, with the upper ends of its side frames, $h\ h$, against the cross-bar $i$ of the frame-uprights B, which is the limit of its upward play, the weight-cord $g$, as the carriage descends by any addition to its weight, winding up and around the involuted grooved pulley $d$, by which any increase in the speed of descent of the carriage is overcome and checked.

Above the carriage C, but in the same vertical plane with its movement, and to the cross-bar $l$ of the frame-uprights B B, is secured the upper end of a hollow vertical cylinder or drum, F, open at its lower end, which, when the carriage is in its highest position, is in contact, or nearly so, with the platform of the same.

G is a hopper at the upper end of drum F, and communicating with it, into which hopper the flour or material to be packed is fed in any proper manner, it passing down through the drum to the platform of the carriage into a flour-bag previously placed upon the said platform, and about and around the drum, as plainly shown in red in Fig. 2, which bag at each side is hung upon hooks $m\ m$ of two cords, $n\ n$, passing up and around the shaft $c$, hereinbefore referred to.

Within this drum, and extending through the same, is a spiral-shaped conveyer or packer, H, attached to a vertical shaft, I, turning in bearings at the upper head of the drum, on which shaft, at its upper end, is a horizontal bevel-gear wheel, $o$, interlocking with another bevel-gear wheel, $p$, of the horizontal shaft $q$ of the uprights B B.

$r$ is a crank-handle on shaft $q$, for revolving the same, by turning which handle in the proper direction the conveyer or packer H, upon the inside of the drum-cylinder, is made to revolve in the proper direction to feed and convey the flour discharged into its upper end through the hopper G down and out of the drum at its lower end into the bag placed about and around it, as before explained, at the same time tightly packing it therein.

$s$ is a spring sliding gate of the throat of the hopper, which, when across the same, closes it, and thus shuts off the communication between the hopper and drum-cylinder. This gate moves upon a cross-plate, $u$, of the uprights B B, and when drawn out of the hopper is there held by interlocking the spring plate or frame $v$ of the uprights B B, and extending across the plane of movement of the weight D, with the notch $w$ of its arm $y$, the spiral spring $x^2$ of the gate immediately throwing it into and across the hopper-throat, and thus closing it upon disconnecting the spring-frame $v$ from its notch $w$.

The operation of the machine above described is as follows: The bag or sack in which the flour is to be packed is first placed over and around the drum-cylinder and hung to the hooks, when, the gate $s$ of the hopper being opened and interlocked with the spring-frame $v$, so as to be thus held, the conveyer-packer upon the inside of the drum-cylinder is then revolved in the proper direction to convey the flour fed into the drum down through the same into the bag, which, as it is thus filled, depresses the carriage, drawing up the weight, and so continues until the weight, by striking against the said spring-frame $v$, releases the same from the notch of the gate, and it then closes, stopping the further passage of flour into the drum. The bag is then removed from the platform of the carriage, a stop, $a^2$, of one of the uprights holding the carriage in place until the bag is removed. The stop $a^2$ is then released from the carriage, and it is immediately drawn up by the weight, when, the gate of the hopper being again opened and another bag hung upon the bag-hooks about the drum-cylinder, the same operations and movements again take place, as before explained, and so on as long as desired.

From the above-described arrangement and operation of the machine it is obvious that, by properly adjusting its several parts, a series of bags of any desired number may be filled with an equal and uniform weight of flour in each case, the importance of which in the packing of flour for market is readily apparent to all.

To the stop $a^2$ is hung one end of a connecting-rod, $b^2$, the other end of which is hung to the arm $c^2$, having handle $d^2$, of a shaft, $f^2$, the toe $g^2$ of which engages with the hopper-gate $s$, through which arrangement and connection of the stop $a^2$ and gate $s$, by simply turning or swinging the handle $d^2$ up, the stop $a^2$ and gate $s$ are respectively and at the same time released from the bag-carriage and moved out of the hopper-throat, the spring-frame $v$ then holding the gate, as before explained.

Although I have herein particularly described my improved machine for the packing and weighing of flour, it may be as well applied to other and various substances, whether pulverized or not; but it is especially adaptable to flour and all other such materials; but I do not intend to limit myself to any particular substance to be packed by it.

I claim as new and desire to secure by Letters Patent—

The arrangement of the stop $a^2$, spring sliding gate $s$, spring-frame $v$, pulley $d$, and weight D, in combination with the carriage C, constructed and operating in the manner and for the purpose herein described.

Portland, Oregon, September 2, 1865.

G. A. WARNER.

Witnesses:
J. N. DOLPH,
A. A. RHOADES.